United States Patent [19]
Cotrel et al.

[11] 3,879,390
[45] Apr. 22, 1975

[54] 2-PYRIDAZINYLISOINDOLIN-1-ONE DERIVATIVES

[75] Inventors: Claude Cotrel, Choisy-Le-Roi; Claude Jeanmart, Brunoy; Mayer Naoum Messer, Bievres, all of France

[73] Assignee: Rhone-Poulenc S.A., Paris, France

[22] Filed: May 2, 1972

[21] Appl. No.: 249,509

[30] Foreign Application Priority Data
May 4, 1971 France .............................. 71.16074
Feb. 23, 1972 France .............................. 72.06108

[52] U.S. Cl. ......... 260/250 A; 260/268 C; 260/325; 424/250
[51] Int. Cl............................................. C07d 51/04
[58] Field of Search ................. 260/250 A, 250 AH

[56] References Cited
UNITED STATES PATENTS
3,198,798  8/1965  Zenitz ................................. 260/268
3,635,976  1/1972  Shetty ............................. 260/256.4

Primary Examiner—Nicholas S. Rizzo
Assistant Examiner—Ralph D. McCloud
Attorney, Agent, or Firm—Stevens, Davis, Miller & Mosher

[57] ABSTRACT

Isoindolin-1-ones carrying on the nitrogen atom a pyridazinyl substituent, which optionally has one to three substituents selected from halogen, alkyl, alkoxy, alkylthio, dialkylamino and phenoxy, and also carrying on the 3-position of the isoindoline ring a 4-methyl-piperazin-1-yl-carbonyloxy substituent, are new therapeutically useful compounds, particularly active as tranquilisers and anti-convulsant agents.

8 Claims, No Drawings

2-PYRIDAZINYLISOINDOLIN-1-ONE DERIVATIVES

This invention relates to new therapeutically useful isoindoline derivatives, to processes for their preparation and pharmaceutical compositions containing them.

The new isoindoline derivatives of the present invention are those of the general formula:

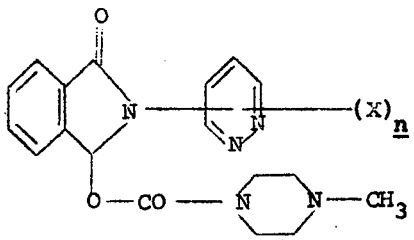

(wherein X represents a halogen atom, or an alkyl, alkoxy or alkylthio radical, each radical containing 1 to 4 carbon atoms, a dialkylamino group containing 1 to 4 carbon atoms in each of the alkyl radicals, or a phenoxy radical, and $n$ represents zero or an integer from 1 to 3) and acid addition salts thereof. When symbol $n$ represents 2 or 3 it is to be understood that the atoms or radicals present on the pyridazinyl ring may be the same or different.

According to a feature of the invention, the isoindoline derivatives of general formula I are prepared by the process which comprises reacting 1-methylpiperazine with a mixed carbonate of the general formula:

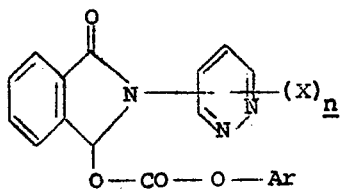

wherein Ar represents a phenyl radical optionally substituted by, for example, an alkyl radical containing 1 to 4 carbon atoms, and X and $n$ are as hereinbefore defined. The reaction is generally carried out in an inert organic solvent, for example acetonitrile, and at a temperature of 15°– 25°C.

The mixed carbonates of general formula II can be prepared by reaction of a chloroformate of the general formula:

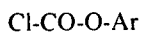

Cl-CO-O-Ar    III (wherein Ar is as hereinbefore defined) with an isoindoline derivative of the general formula:

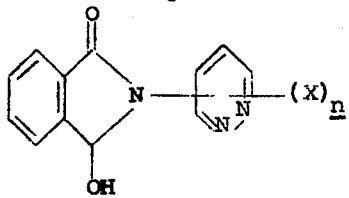

wherein X and $n$ are as hereinbefore defined. The reaction is generally carried out in a basic organic solvent, for example pyridine, and at a temperature below 10°C.

The isoindoline derivatives of general formula IV can be obtained by the partial reduction of a phthalimide of the general formula:

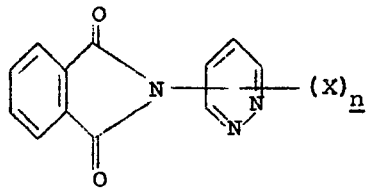

wherein X and $n$ are as hereinbefore defined. The reduction is generally carried out by means of an alkali metal borohydride in an hydroxylic solvent medium.

The phthalimides of general formula V can be obtained by reacting an aminopyridazine of the general formula:

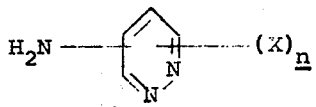

(wherein X and $n$ are as hereinbefore defined) with phthalic anhydride.

According to another feature of the invention, the isoindoline derivatives of general formula I are prepared by the process which comprises reacting 1-chlorocarbonyl-4-methylpiperazine with an alkali metal salt, optionally prepared in situ, of an isoindoline derivative of general formula IV. The reaction is generally carried out in an anhydrous inert organic solvent, for example dimethylformamide, at a temperature below 50°C.

The isoindoline derivatives of general formula I obtained by the aforementioned processes can be purified by physical methods such as distillation, crystallisation or chromatography, or by chemical methods such as the formation of salts, crystallisation of the salts and decomposition of them in an alkaline medium. In carrying out the said chemical methods the nature of the anion of the salt is immaterial, the only requirement being that the salt must be well-defined and readily crystallisable.

The isoindoline derivatives of general formula I may be converted by methods known per se into acid addition salts. The acid addition salts may be obtained by the action of acids on the isoindoline derivatives in appropriate solvents. As organic solvents there may be used alcohols, ethers, ketones or chlorinated hydrocarbons. The salt which is formed is precipitated, if necessary after concentration of the solution, and is isolated by filtration or decantation.

The isoindoline derivatives of the invention and their acid addition salts possess valuable pharmacological properties; they are particularly active as tranquillisers and anti-convulsant agents. In animals (mice) they have proved active as such at doses of between 10 and 100 mg./kg. animal body weight when administered orally, in particular in the following tests:

i. electric battle test according to a technique similar to that of Tedeschi et al. [J. Pharmacol., 125, 28 (1959)], ii. convulsion with pentetrazole according to a technique similar to that of Everett and Richards [J. Pharmacol., 81, 402 (1944)], iii. supramaximal electroshock according to the technique of Swinyard et al [J. Pharmacol., 106, 319 (1952)], and iv. locomotor activity according to the technique of Courvoisier [Congrès de Medecins Aliénistes et Neurologistes - Tours - (8/13th June, 1959)].

Preferred isoindoline derivatives of the invention are those of general formula I in which the pyridazinyl ring is linked at the 3-position to the isoindoline group, and especially those compounds wherein X represents a halogen (preferably chlorine) atom, or an alkyl, alkoxy or alkylthio radical containing 1 to 4 carbon atoms, attached to the 6-position of the pyridazin-3-yl ring and n represents 1, and acid addition salts thereof. Compounds of the invention of importance are 2-(6-methoxypyridazin-3-yl)-3-(4-methylpiperazin-1-yl)carbonyloxy-isoindolin-1-one, 2-(6-chloropyridazin-3-yl)-3-(4-methylpiperazin-1-yl)-carbonyloxy-isoindolin-1-one, 2-(6-methylpyridazin-3-yl)-3-(4-methylpiperazin-1-yl)carbonyloxy-isoindolin-1-one, 2-(6-methylthiopyridazin-3-yl)-3-(4-methylpiperazin-1-yl)-carbonyloxy-isoindolin-1-one and 2-(6-ethoxypyridazin-3-yl)-3-(4-methylpiperazin-1-yl)carbonyloxy-isoindolin-1-one, and acid addition salts thereof.

For therapeutic purposes, the isoindoline derivatives of general formula I may be employed as such or in the form of non-toxic acid addition salts, i.e. salts containing anions which are relatively innocuous to the animal organism in therapeutic doses of the salts (such as hydrochlorides, sulphates, nitrates, phosphates, acetates, propionates, succinates, benzoates, fumarates, maleates, tartrates, theophyllinacetates, salicylates, phenolphthalinates and methylene-bis-$\beta$-hydroxynaphthoates) so that the beneficial physiological properties inherent in the bases are not vitiated by by side-effects ascribable to the anions.

The following Examples illustrate the invention.

EXAMPLE 1

A solution of 2-(6-methoxypyridazin-3-yl)-3-hydroxy-isoindolin-1-one (10 g.) in anhydrous dimethylformamide (100 cc.) is added to a suspension of sodium hydride (50% dispersion in mineral oil) (2.08 g.) in anhydrous dimethylformamide (50 cc.), whilst maintaining the temperature at about 27°C. When the evolution of gas has ceased, a solution of 1-chlorocarbonyl-4-methylpiperazine (7 g.) in anhydrous dimethylformamide (15 cc.) is added whilst maintaining the temperature at about 30°C. The reaction mixture is stirred for a further half an hour after the end of the addition and is then poured into ice-water (1,000 cc.). The crystalline product is filtered off and then washed with water (100 cc.). After drying, a product (12.5 g.) melting at 181°–182°C. is obtained. Recrystallisation from acetonitrile (150 cc.) containing 10% of 1-methylpiperazine, yields 2-(6-methoxypyridazin-3-yl)-3-(4-methylpiperazin-1-yl)carbonyloxy-isoindolin-1-one (8.9 g.) melting at 183° C.

2-(6-Methoxypyridazin-3-yl)-3-hydroxyisoindolin-1-one employed as starting material can be prepared by adding potassium borohydride (2 g.) to a suspension of 3-methoxy-6-phthalimidopyridazine (12.5 g.) in methanol (125 cc.), whilst stirring and maintaining the temperature at about 30°C. After 1 hour at a temperature of about 20°C., the insoluble product is filtered off and then washed with methanol (30 cc.). After drying, 2-(6-methoxypyridazin-3-yl)3-hydroxy-isoindolin-1-one (10.6 g.), melting at 207°C., is obtained.

3-Methoxy-6-phthalimidopyridazine can be prepared by heating under reflux, over a period of one hour, a mixture of phthalic anhydride (14.8 g.) and 3-amino-6-methoxypyridazine (12.5 g.) in acetic acid (150 cc.). After cooling, the reaction mixture is poured into ice-water (1,000 cc.). The crystalline product is filtered off and then washed with water (200 cc.). After drying, 3-methoxy-6-phthalimidopyridazine (13.6 g.) melting at 206°C. is obtained.

3-Amino-6-methoxypyridazine can be prepared according to the method described by J. H. Clark et al., J. Amer. Chem. Soc., 80, 980 (1958).

EXAMPLE 2

A solution of 2-(6-chloropyridazine-3-yl)-3-hydroxy-isoindolin-1-one (13.07 g.) in anhydrous dimethylformamide (200 cc.) is added to a suspension of sodium hydride (50% dispersion in mineral oil) (2.64 g.) in anhydrous dimethylformamide (100 cc.), whilst maintaining the temperature at about 23°C. When the evolution of gas has ceased, a solution of 1-chlorocarbonyl-4-methylpiperazine (8.95 g.) in anhydrous dimethylformamide (50 cc.) is added. The reaction mixture is stirred for a further 30 minutes after the end of the addition and is then poured into ice-water (1,500 cc.). The oily product which separates out is extracted with methylene chloride (2,000 cc.). The solution obtained is washed with water (400 cc.), dried over sodium sulphate, and then concentrated to dryness under reduced pressure. The oil obtained is suspended in petroleum ether (100 cc.). The crystalline product is filtered off and then washed with petroleum ether (60 cc.). This product is dissolved in methylene chloride (100 cc.). After the removal of a slight amount of insoluble material by filtration, the solution is poured onto silica gel (150 g.) contained in a column (4.5 cm. in diameter). The column is then eluted with methylene chloride (1,200 cc.), and then with a mixture of ethyl acetate-methanol (1-1 by volume) (300 cc.). These eluates are discarded. The column is then eluted with a mixture of ethyl acetate-methanol (1-1 by volume) (300 cc.). The solution obtained is concentrated to dryness under reduced pressure (20 mm.Hg) to give a product (15 g.) melting at 170°C. On recrystallisation from ethanol (200 cc.), 2-(6-chloropyridazin-3-yl)-3-(4-methylpiperazin-1-yl)carbonyloxy-isoindolin-1-one (8.4 g.), melting at 170°C., is obtained.

2-(6-Chloropyridazin-3-yl)-3-hydroxyisoindolin-1-one employed as starting material can be prepared by slowly adding a solution of potassium borohydride (4.05 g.) in water (30 cc.) to a suspension of 3-chloro-6-phthalimidopyridazine (25.9 g.) in dioxan (300 cc.). After 17 hours at a temperature of about 23°C., water (400 cc.) is added to the reaction mixture. The insoluble product is filtered off and then washed with water (50 cc.). After drying, 2-(6-chloropyridazin-3-yl)-3-hydroxy-isoindolin-1-one (14.9 g.), melting at 250°C., is obtained.

3-Chloro-6-phthalimidopyridazine can be prepared by heating a mixture of phthalic anhydride (14.8 g.) and 3-amino-6-chloropyridazine (12.95 g.) in diphenyl ether (130 cc.) for 10 minutes at 170°C. The reaction mixture is then allowed to cool to 35°C. and anaesthetic grade diethyl ether (100 cc.) is added. A product (17.5 g.) melting at 186°C. is thus obtained. On recrystallisation from dioxan (130 cc.), 3-chloro-6-phthalimidopyridazine (5.1 g.), melting at 210°C., is obtained. Addition of anaesthetic grade diethyl ether (45 cc.) to the mother liquors yields a second crop of 3-chloro-6-phthalimidopyridazine (4.2 g.) melting at 210°C.

3-Amino-6-chloropyridazine can be prepared according to the method described by Druey et al., Helv. Chim. Acta, 37, 121 (1954).

EXAMPLE 3

A solution of 2-(pyridazin-3-hydroxyisoindolin-1-one (7.6 g.) in anhydrous dimethylformamide (45 cc.) is added to a suspension of sodium hydride (50% dispersion in mineral oil)(1.78 g.) in anhydrous dimethylformamide (65 cc.), whilst maintaining the temperature at about 23°C. When the evolution of gas has ceased, a solution of 1-chlorocarbonyl-4-methylpiperazine (6.45 g.) in anhydrous dimethylformamide (35 cc.) is added. The reaction mixture is stirred for a further 30 minutes and is then poured into ice-water (1,200 cc.). The oily product which separates out is extracted with methylene chloride (600 cc.). The solution obtained is washed with water (300 cc.), dried over sodium sulphate, and then concentrated to dryness under reduced pressure. The oil obtained is suspended in diisopropyl ether (50 cc.). The crystalline product is filtered off and then washed with diisopropyl ether (5 cc.). A product (7.5 g.) melting at 177°C. is thus obtained. On recrystallisation from ethanol (60 cc.), 2-(pyridazin-3-yl)-3-(4-methylpiperazin-1-yl)-carbonyloxy-isoindolin-1one (5.1 g.), melting at 180°C., is obtained.

2-(Pyridazin-3-yl)-3-hydroxy-isoindolin-1-one employed as starting material can be prepared by slowly adding potassium borohydride (1.96 g.) to a suspension of 3-phthalimidopyridazine (10.9 g.) in methanol (110 cc.) whilst maintaining the temperature at about 20°C. After 30 minutes at 20°C., water (20 cc.) is added to the reaction mixture. The insoluble product is filtered off and then washed with water (20 cc.). After drying, 2-(pyridazin-3-yl)-3-hydroxy-isoindolin-1-one (7.5 g.), melting at 242°C., is obtained.

3-Phthalimidopyridazine can be prepared by heating under reflux for 30 minutes a solution of phthalic anhydride (14.8 g.) and 3-aminopyridazine (9.2 g.) in anhydrous dimethylformamide (100 cc.). After cooling, the reaction mixture is poured into benzene (1,000 cc.). An insoluble product (2.8 g.) is filtered off, and then the mother liquors are concentrated to dryness under reduced pressure (20 mm.Hg). The oil obtained is dissolved in ethyl acetate (50 cc. ) and the solution obtained is left to stand for 2 hours at 4°C. The product which crystallises is filtered off and then washed with ethyl acetate (10 cc.). After drying, 3-phthalimidopyridazine (7.6 g.) melting at 172°C., is obtained.

3-Aminopyridazine can be prepared according to the method described by Steck et al., J. Amer. Chem. Soc., 76, 4454 (1954).

EXAMPLE 4

A suspension of 2-(6-methylpyridazin-3-yl)-3-hydroxy-isoindolin-1-one (17.8 g.) in anhydrous dimethylformamide (800 cc.) is added to a suspension of sodium hydride (50% dispersion in mineral oil) (4 g.) in anhydrous dimethylformamide (80 cc.), whilst maintaining the temperature at about 20°C. When the evolution of gas has ceased, 1-chlorocarbonyl-4-methylpiperazine (13.8 g.) is added. The reaction mixture is stirred for a further 2 hours and is then poured into ice-water (4,000 cc.). The product which precipitates is extracted with methylene chloride (2,000 cc.). The solution obtained is dried over sodium sulphate and then concentrated to dryness under reduced pressure. The solid obtained is washed 3 times with diisopropyl ether (total 75 cc.). After drying, a product (24.4 g.) melting at 194°C. is obtained. On recrystallisation from acetonitrile (210 cc.), 2-(6-methylpyridazin-3-yl)-3-(4-methylpiperazin-1-yl)carbonyloxy-isoindolin-1-one (20.5 g.), melting at 192°C., is obtained.

2-(6-Methylpyridazin-3-yl)-3-hydroxy-isoindolin-1-one employed as starting material can be prepared by adding a solution of potassium borohydride (3.64 g.) in water (29 cc.) and N sodium hydroxide (3.8 cc.) to a suspension of 3-methyl-6-phthalimidopyridazine (21 g.) in methanol (105 cc.) whilst stirring and maintaining the temperature at about 15°C. After 2 hours at 20°C., the insoluble product is filtered off and then washed with methanol (60 cc.). After drying, 2-(6-methylpyridazin-3-yl)-3-hydroxy-isoindolin-1-one (18.4 g.), melting at 232°C., is obtained.

3-Methyl-6-phthalimidopyridazine can be prepared by heating a mixture of phthalic anhydride (14.8 g.) and 3-amino-6-methylpyridazine (10.9 g.) in diphenyl ether (74 cc.) for 20 minutes at a temperature of about 190°C. The reaction mixture is then left to cool to 45°C. and diisopropyl ether (25 cc.) is added. The product which crystallises is filtered off and then washed with diisopropyl ether (30 cc.). After drying, 3-methyl-6-phthalimidopyridazine (21.5 g.) melting at 214°C. is obtained.

3-Amino-6-methylpyridazine can be prepared according to the method described by W. G. Overend and L. F. Wiggins, J. Chem. Soc., 239 (1947).

EXAMPLE 5

By following the procedure of Example 4 but starting with 2-(6-methylthiopyridazin-3-yl)-3-hydroxy-isoindolin-1-one (24.8 g.) and 1-chlorocarbonyl-4-methylpiperazine (16.4 g.), 2-(6-methylthiopyridazin-3-yl)-3-(4-methylpiperazin-1-yl)carbonyloxy-isoindolin-1-one (21.7 g.), melting at 195°–196°C., is obtained.

2-(6-Methylthiopyridazin-3-yl)-3-hydroxy-isoindolin-1-one (m.p. 222°C.) employed as starting material can be prepared by reacting potassium borohydride with 3-methylthio-6-phthalimidopyridazine in an aqueous-methanolic medium at a temperature of about 20°C.

3-Methylthio-6-phthalimidopyridazine (m.p. 236°–238°C.) can be prepared by reacting phthalic anhydride with 3-amino-6-methylthiopyridazine in diphenyl ether at a temperature of about 190°C.

3-Amino-6-methylthiopyridazine can be prepared according to the method described by M. Fujisaka et al., Bull. Chem. Soc. Japan, 37, 1107 (1964).

EXAMPLE 6

By following the procedure of Example 4 but starting with 2-(6-ethoxypyridazin-3-yl)-3-hydroxy-isoindolin-1-one (24 g.) and 1-chlorocarbonyl-4-methylpiperazine (15.8 g.), 2-(6-ethoxypyridazin-3-yl)-3-(4-methylpiperazin-1-yl)carbonyloxy-isoindolin-1-one (20.8 g.), melting at 154°C., is obtained.

2-(6-Ethoxypyridazin-3-yl)-3-hydroxy-isoindolin-1-one (m.p. 175°C.) employed as starting material can be prepared by reacting potassium borohydride with 3-ethoxy-6-phthalimidopyridazine in a methanolic medium at a temperature of about 20°C.

3-Ethoxy-6-phthalimidopyridazine (m.p. 230°C.) can be prepared by reacting phthalic anhydride with 3-amino-6-ethoxypyridazine in diphenyl ether at a temperature of about 200°C.

3-Amino-6-ethoxypyridazine can be prepared according to the method described by T. Horie et al., Chem. Pharm. Bull. (Tokyo), 10, 580 (1962).

EXAMPLE 7

2-(6-Dimethylaminopyridazin-3-yl)-3-hydroxy-isoindolin-1-one (32.7 g.) is added to a suspension of sodium hydride (50% dispersion in mineral oil) (6.35 g.) in anhydrous dimethylformamide (655 cc.), whilst maintaining the temperature at about 25°C. When the evolution of gas has ceased, a solution of 1-chlorocarbonyl-4-methylpiperazine (21.5 g.) in anhydrous dimethylformamide (45 cc.) is added. The reaction mixture is stirred for a further 2 hours and is then poured into ice-water (3,500 cc.). The product which precipitates is extracted with methylene chloride (1,500 cc.). The solution obtained is washed with water (250 cc.), dried over sodium sulphate, and then concentrated to dryness under reduced pressure. The residue obtained is taken up in acetonitrile (150 cc.) and the insoluble product is filtered off and then washed with acetonitrile (60 cc.) and diisopropyl ether (50 cc.). After drying, a product (27.6 g.) melting at 182°–184°C. is obtained. This product is dissolved in chloroform (250 cc.) and the solution obtained is filtered through silica gel (550 g.) contained in a column (6 cm. in diameter). The column is eluted with chloroform (6,000 cc.), a mixture of chloroform-ethyl acetate (9-1 by volume) (2,000 cc.), a mixture of chloroform-ethyl acetate (3-1 by volume) (2,000 cc.), a mixture of chloroformethyl acetate (1-1 by volume) (2,000 cc.), pure ethyl acetate (3,000 cc.), a mixture of ethyl acetate-methanol (9-1 by volume) (2,000 cc.) and a mixture of ethyl acetate-methanol (3-1 by volume) (3,000 cc.). All these eluates are discarded. The column is then eluted with a mixture of ethyl acetate-methanol (3-1 by volume) (4,000 cc.). After evaporating this eluate under reduced pressure and recrystallising the residue from acetonitrile (225 cc.), 2-(6-dimethylaminopyridazin-3-yl)-3-(4-methylpiperazin-1-yl)carbonyloxy-isoindolin-1 -one (15 g.), melting at 188°C., is obtained.

2-(6-Dimethylaminopyridazin-3-yl)-3-hydroxyisoindolin-1-one employed as starting material can be prepared by adding potassium borohydride (5.8 g.) to a suspension of 3-dimethylamino-6-phthalimidopyridazine (38 g.) in methanol (425 cc.) whilst stirring and maintaining the temperature at about 40°C. After 1 hour at 40°C., the reaction mixture is cooled to 20°C. and the product which crystallises is filtered off and then washed with methanol (50 cc.). After drying, 2-(6-dimethylaminopyridazin-3-yl)-3-hydroxy-isoindolin-1-one (32.7 g.) melting at 208°C. is obtained.

3-Dimethylamino-6-phthalimidopyridazine can be prepared by heating a mixture of phthalic anhydride (22.5 g.) and 3-amino-6-dimethylaminopyridazine (21 g.) in diphenyl ether (150 cc.) for half an hour at a temperature of about 240°C. The reaction mixture is then allowed to cool to 45°C., and diisopropyl ether (250 cc.) is added. The product which crystallises is filtered off and washed with diisopropyl ether (50 cc.). After drying, 3-dimethylamino-6-phthalimidopyridazine (38 g.) melting at 312°C. is obtained.

3-Amino-6-dimethylaminopyridazine can be prepared by heating for 30 hours a mixture of 3-amino-6-chloropyridazine (78 g.) and dimethylamine (136 g.) in ethanol (500 cc.) in an autoclave at 130°C. The brown solution, which is obtained after cooling and releasing the gas in the autoclave, is evaporated to dryness under reduced pressure. The resulting residue is treated with water (350 cc.) and decolourising charcoal (10 g.). After filtration, the solution obtained is saturated with potassium carbonate and extracted three times with ethyl acetate (total 750 cc.). The organic solution is then treated with decolourising charcoal (5 g.), dried over sodium sulphate, filtered, and evaporated to dryness under reduced pressure. A product (76.1 g.), melting at about 125°C., is thus obtained. After two recrystallisations from benzene, 3-amino-6-dimethylaminopyridazine (53 g.) melting at 126°C. is obtained.

EXAMPLE 8

By following the procedure of Example 4 but starting with 2-(6-phenoxypyridazin-3-yl)-3-hydroxy-isoindolin-1-one (6.3 g.) and 1-chlorocarbonyl-4-methylpiperazine (3.55 g.), 2-(6-phenoxypyridazin-3-yl)-3-(4-methylpiperazin-1-yl)carbonyloxy-isoindolin-1-one (3.7 g.), melting at 176°C. after transformation at 165°C., is obtained.

2-(6-Phenoxypyridazin-3-yl)-3-hydroxy-isoindolin-1-one (m.p. 205°C.) employed as starting material can be prepared by reacting potassium borohydride with 3-phenoxy-6-phthalimidopyridazine in a mixture of dioxan and water (9-1 by volume).

3-Phenoxy-6-phthalimidopyridazine (m.p. 190°C.) can be prepared by reacting phthalic anhydride with 3-amino-6-phenoxypyridazine in diphenyl ether at a temperature of about 190°C.

3-Amino-6-phenoxypyridazine can be prepared according to the method which is described in U.S. Pat. No. 2,891,953.

The present invention includes within its scope pharmaceutical compositions comprising, as active ingredient, at least one of the isoindoline derivatives of general formula I, or a non-toxic acid addition salt thereof, in association with a pharmaceutical carrier or coating. The invention includes especially such preparations made up for oral, parenteral or rectal administration.

Solid compositions for oral administration include tablets, pills, powders and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water or liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilized by, for example, filtration through a bacteria-retaining filter, by incorporation in the compositions of sterilizing agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions when administered orally to an adult should generally give doses between 50 mg. and 500 mg. of active substance per day. In general the physician will decide the posology considered appropriate, taking into account the age and weight and other factors intrinsic to the patient being treated.

The following Examples illustrate pharmaceutical compositions according to the invention.

EXAMPLE 9

Tablets containing 25 mg. of active product and having the following composition are prepared in accordance with the usual technique:

| | |
|---|---|
| 2-(6-methoxypyridazin-3-yl)-3-(4-methylpiperazin-1-yl)carbonyloxy-isoindolin-1-one | 0.025 g. |
| starch | 0.090 g. |
| precipitated silica | 0.030 g. |
| magnesium stearate | 0.005 g. |

EXAMPLE 10

Tablets containing 25 mg. of active product having the following composition are prepared in accordance with the usual technique:

| | |
|---|---|
| 2-(6-methylpyridazin-3-yl-3-(4-methylpiperazin-1-yl-carbonyloxy-isoindolin-1-one | 0.025 g. |
| starch | 0.090 g. |
| precipitated silica | 0.030 g. |
| magnesium stearate | 0.005 g. |

We claim:
1. An isoindoline of the formula:

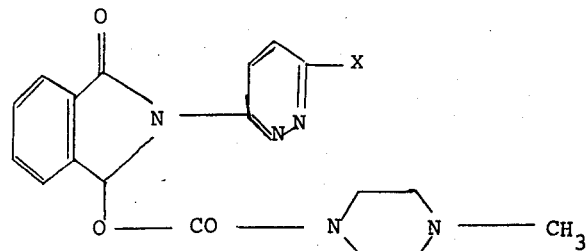

wherein X is hydrogen, chlorine, alkyl of 1 to 4 carbon atoms, alkoxy of 1 to 4 carbon atoms, or alkylthio of 1 to 4 carbon atoms; and non-toxic acid addition salts thereof.

2. An isoindoline according to claim 1, wherein X is chlorine, alkyl of 1 to 4 carbon atoms or alkoxy of 1 to 4 carbon atoms.

3. The isoindoline derivative according to claim 1 which is 2-(6-methoxypyridazin-3-yl)-3-(4-methylpiperazin-1-yl)carbonyloxy-isoindolin-1-one and non-toxic acid addition salts thereof.

4. The isoindoline derivative according to claim 1 which is 2-(6-chloropyridazin-3-yl)-3-(4-methylpiperazin-1-yl)carbonyloxy-insoindolin-1-one and non-toxic acid addition salts thereof.

5. The isoindoline derivative according to claim 1 which is 2-(6-methylpyridazin-3-yl)-3-(4-methylpiperazin-1-yl)carbonyloxy-isoindolin-1-one and non-toxic acid addition salts thereof.

6. The isoindoline derivative according to claim 1 which is 2-(6-methylthiopyridazin-3-yl)-3-(4-methylpiperazin-1-yl)carbonyloxy-isoindolin-1-one and non-toxic acid addition salts thereof.

7. The isoindoline derivative according to claim 1 which is 2-(6-ethoxypyridazin-3-yl)-3-(4-methylpiperazin-1-yl)carbonyloxy-isoindolin-1-one and non-toxic acid addition salts thereof.

8. The isoindoline derivative according to claim 1 which is 2-(pyridazin-3-yl)-3-(4-methylpiperazin-1-yl)carbonyloxy-isoindolin-1-one and non-toxic acid addition salts thereof.

* * * * *